(12) United States Patent
Houdek et al.

(10) Patent No.: US 12,391,511 B2
(45) Date of Patent: Aug. 19, 2025

(54) COMPUTE MODULE FOR HELMET MOUNTED VISUAL COMMUNICATION AND NAVIGATION SYSTEM

(71) Applicant: Qwake Technologies, Inc., San Francisco, CA (US)

(72) Inventors: Phil Houdek, San Jose, CA (US); Mike Ralston, Mountain View, CA (US); Omer Haciomeroglu, Austin, TX (US); Sam Cossman, Austin, TX (US)

(73) Assignee: Qwake Technologies, Inc., San Francisco, CA (US)

( * ) Notice: Subject to any disclaimer, the term of this patent is extended or adjusted under 35 U.S.C. 154(b) by 0 days.

(21) Appl. No.: 18/371,510

(22) Filed: Sep. 22, 2023

(65) Prior Publication Data

US 2024/0237775 A1    Jul. 18, 2024

Related U.S. Application Data

(60) Provisional application No. 63/409,202, filed on Sep. 22, 2022.

(51) Int. Cl.
*B65H 59/04* (2006.01)
*B65H 49/32* (2006.01)
*G02B 27/01* (2006.01)

(52) U.S. Cl.
CPC ........... *B65H 59/04* (2013.01); *B65H 49/325* (2013.01); *G02B 27/0172* (2013.01); *G02B 27/0176* (2013.01)

(58) Field of Classification Search
None
See application file for complete search history.

(56) References Cited

U.S. PATENT DOCUMENTS

| | | | |
|---|---|---|---|
| 2022/0163809 A1* | 5/2022 | Lee | G02B 27/0176 |
| 2023/0025019 A1* | 1/2023 | Youngblood | G02B 27/017 |

* cited by examiner

*Primary Examiner* — Ifedayo B Iluyomade
(74) *Attorney, Agent, or Firm* — Marton Ribera Schumann & Chang LLP; Chien-Ju Alice Chuang

(57) ABSTRACT

The technology described herein relates to a compute module for a helmet mounted visual communication and navigation system. A compute module for a helmet mounted visual communication and navigation system may include a housing having two larger regions provided symmetrically and a smaller region provided between the two larger regions, an internal compute subassembly including a printed circuit board assembly (PCBA) having two wider portions corresponding to the two larger regions of the housing and a narrower portion corresponding to the smaller region of the housing, heat sinks configured to store heat dissipated from electronic components of the internal compute subassembly, a cable connection interface, and a power button. The compute module also may include an antenna or other sensor for receiving and transmitting data associated with a user.

21 Claims, 12 Drawing Sheets

COMPUTE MODULE FOR HELMET MOUNTED VISUAL COMMUNICATION AND NAVIGATION SYSTEM

CROSS-REFERENCE TO RELATED APPLICATIONS

This application claims priority to U.S. Provisional Patent Application No. 63/409,202 entitled "Compute Module for Helmet Mounted Navigation and Communications System," filed Sep. 22, 2022, the contents of which are hereby incorporated by reference in their entirety.

FIELD OF INVENTION

The present invention relates to fire fighting, military, and safety gear. More particularly, the invention is directed to a wearable helmet mounted visual communication and navigation system.

BACKGROUND OF INVENTION

Fire fighting, life safety situations, military, law enforcement, emergency rescues, public safety and other missions and exercises frequently create a need for emergency response personnel and other critical workers to be able to see in the dark and through smoke. In such situations, navigation and communications gear that can provide emergency response personnel with more information to safely and quickly operate is essential. Conventional solutions include handheld thermal cameras, handheld radios, shoulder microphones, face mask mounted microphones and radios, flashlights, and physical tags. However, handheld implementations are cumbersome in emergency situations, and occupy hands that are needed for other tasks. Handheld implementations also often operate at a relatively larger distance from a user's eye, which increases the likelihood that smoke will obscure the visual path between the user's and the display screen.

Problems with existing solutions for mounting thermal cameras, or other navigation and communications gear, onto a user's wearable safety helmet or other wearable safety gear (i.e., onto a part of a uniform or other body-worn gear) includes unevenly weighing down a front or side of helmets and body-worn gear, snag hazards, and, when mounted onto other wearable safety gear, lack of ability to track a user's head motion.

Therefore, a compute module for a helmet mounted (i.e., hands free) visual communication and navigation system is desirable.

BRIEF SUMMARY

The present disclosure provides for a compute module for a helmet mounted visual communication and navigation system. A compute module for a helmet mounted visual communication and navigation system may include: a housing having two larger regions provided symmetrically and a smaller region provided between the two larger regions; an internal compute subassembly including a printed circuit board assembly (PCBA) having two wider portions corresponding to the two larger regions of the housing and a narrower portion corresponding to the smaller region of the housing; two or more heat sinks configured to store heat dissipated from electronic components of the internal compute subassembly; a cable connection interface; and a power button. In some examples, the cable connection interface comprises an ingress protected locking electrical connector configured to mate with a corresponding connection interface on a cable.

In some examples, the system also includes a mounting stud on a top surface of the compute module, the mounting stud configured to couple to a compute module attachment, the compute module attachment configured to removably couple the compute module to a helmet. In some examples, the system also includes: a latching pocket configured to engage with a locking mechanism on a compute module attachment; and a button configured to release the latching pocket from the locking mechanism. In some examples, the housing and the PCBA each comprise a portion shaped to fit around a back portion of a user's head. In some examples, the two or more heat sinks are distributed between the two larger regions of the housing in a manner that balances an overall mass of the compute module. In some examples, each of the two or more heat sinks comprises a heat sink core and a heat sink shell. In some examples, the two wider portions of the PCBA comprise more heat-producing electronics and are adjacent to the two or more heat sinks. In some examples, the internal compute subassembly further comprises a heat spreader. In some examples, the head spreader is configured to provide a stiffening support for the internal compute subassembly. In some examples, the heat spreader comprises an antenna support configured to couple an antenna to the internal compute subassembly. In some examples, the antenna support is configured to position one or more antennas along a rear area of the compute module such that the one or more antennas have a wide field of view. In some examples, the compute module further comprises a sensor configured to receive and transmit data related to a user. In some examples, the sensor comprises one, or a combination, of an NFC antenna, an RFID antenna, a camera, and a scanner. In some examples, the internal compute subassembly comprises a top subassembly, including a cover, a top enclosure part, a top insulation, and a flex circuit. In some examples, the cover comprises an elastomer material configured to protect a charging and communications port. In some examples, the flex circuit is configured to connect to the charging and communications port.

In some examples, the internal compute subassembly comprises a bottom subassembly, including one, or a combination, of a bottom enclosure housing, a bottom insulation, a rear light sub-assembly, a cable connection interface cover, a cable connection interface opening, a power button opening, and a light PCBA cutout. In some examples, the bottom enclosure housing comprises an injection molded material characterized by a high impact strength and high heat deflection temperature. In some examples, the rear light sub-assembly comprises a PCB with LED configured to project light through a clear light pipe and out of an opening in the bottom enclosure housing. In some examples, the cable connection interface opening provides a passage for an electrical connector to pass through a layer of insulation. In some examples, the light PCBA cutout comprises two symmetrically placed cutouts to allow the real light sub-assembly to pass through one or both of an insulation and a surface of the housing. In some examples, the system also includes an insulation, wherein the insulation comprises a top insulation portion corresponding to a top inner surface of the housing and a bottom insulation portion corresponding to a bottom inner surface of the housing.

BRIEF DESCRIPTION OF THE DRAWINGS

Various non-limiting and non-exhaustive aspects and features of the present disclosure are described hereinbelow with references to the drawings, wherein.

Figure 1A:
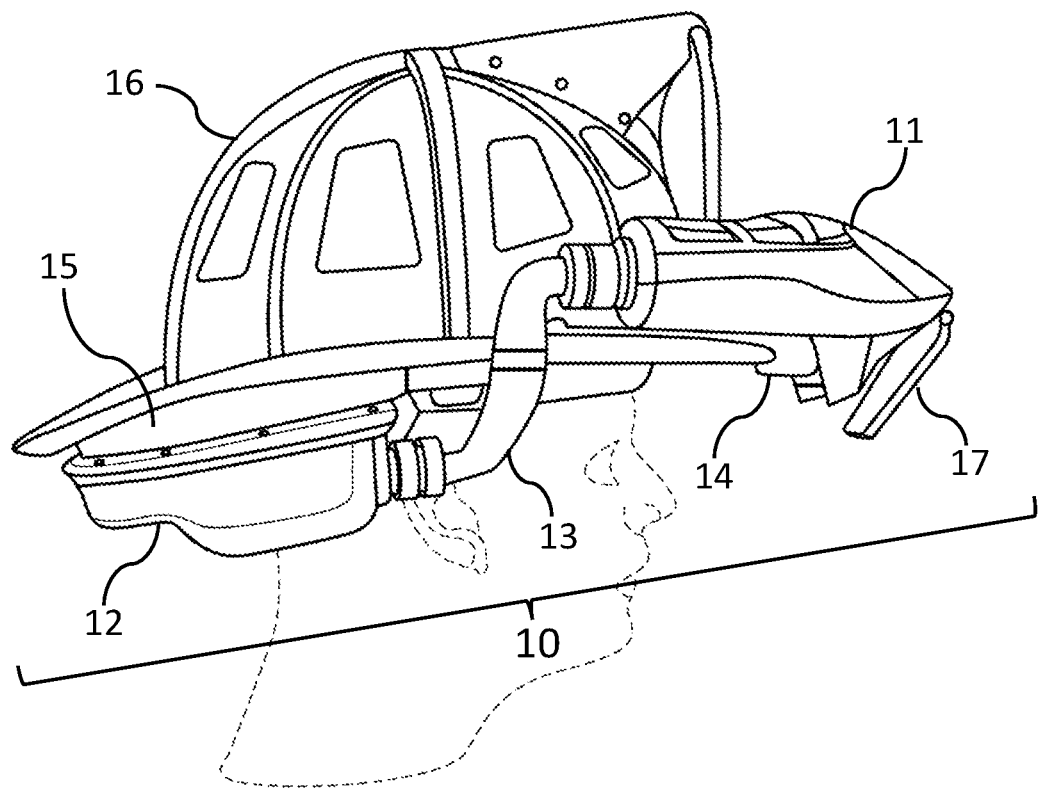
FIGS. 1A-1B are a side and a perspective view of an exemplary helmet with a balanced helmet mounted visual communication and navigation system, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to a balanced helmet mounted (i.e., hands free) visual communication and navigation system. A helmet mounted visual communication and navigation system may include a vision module coupled to a front portion (e.g., a front surface) of a helmet, a compute module coupled to a rear (i.e., back) surface of the helmet, a cable that connects the vision module and the compute module, a first attachment element configured to removably couple the vision module to the helmet, a second attachment element configured to removably couple the compute module to the helmet. The vision and compute modules may provide navigation functions (e.g., using lights, laser, camera, heads up display (HUD), navigation user interface, processing and compute for control thereof) for the balanced helmet mounted visual communication and navigation system. The vision and compute modules also may provide communication functions (e.g., using lights, laser, user control buttons). The first attachment element may comprise mating features to the helmet's contours on a first side and to the vision module on a second side. The second attachment element may comprise mating features to the helmet's contours on a first side and to the compute module on a second side. The first and second attachment elements allow the vision module and compute module, respectively, to be attached to, and detached from, the helmet. In some examples, the vision module and compute module may be coupled to various different (e.g., varying designs) and unique (e.g., separate, user-specific) helmets. For example, the shape, pattern, number of adhesive mount pads, and other configurations, on a helmet-facing portion of a compute module attachment may be varied to match different types of helmets, while keeping shape and coupling elements of a compute module-facing portion of a compute module attachment matching that of a given compute module. For example, the module-facing side of a second attachment may be contoured to fit a compute module surface, this module-facing contour may be maintained across different types of helmets, while the helmet-facing side may be contoured to fit an inner helmet surface of the back portion of a helmet and may be varied across different types of helmets. This modular design allows for a given compute module to be removably coupled to different types of helmets. Similarly, the shape, pattern, helmet-coupling elements, and other configurations, on a helmet-facing portion of a vision module attachment may be varied to match different types of helmets, while keeping shape and coupling elements of a vision module-facing portion of a vision module attachment matching that of a given vision module. This modular design allows for a given compute module to be removably coupled to different types of helmets.

A visual communication and navigation system may be coupled to parts of a safety helmet and may comprise built-in thermal camera and other sensors, a HUD to view enhanced visual information comprising both raw and processed sensor data from said thermal camera and other sensors. The thermal camera and other sensors may include situational awareness sensors (e.g., cameras (e.g., a thermal imaging camera (TIC), a radiometric thermal camera, a drone camera), a spectrometer, a photosensor, a magnetometer, a seismometer, a gas detector, a chemical sensor, a radiological sensor, a voltage detector, a flow sensor, a scale, a thermometer, a pressure sensor, an acoustic sensor (e.g., selective active noise cancellation to facilitate radio communication), an inertial measurement unit, a GPS sensor, a speedometer, a pedometer, an accelerometer, an altimeter, a barometer, an attitude indicator, a depth gauge, a compass (e.g., fluxgate compass), a gyroscope, and the like) and biometric sensors to measure (e.g., monitor) health conditions and status of a user (e.g., a heart rate sensor, a blood pressure monitor, a glucose sensor, an electrocardiogram (e.g., EKG or ECG) sensor, an electroencephalogram (EEG) sensor, an electromyography (EMG) sensor, a respiration sensor, a neurological sensor, and the like). In some examples, the visual communications and navigation system also may include a pointing laser (e.g., for depth measurement in an extreme environment with low visibility, otherwise to help a user navigate, as well as a visual indication to other personnel of the user's presence and approximate location) and other tools.

The visual communication and navigation system may be helmet mounted such that the visual and other sensors can track a user's head motion and approximates where the user is looking so that the heads up display includes the user's current point of view. For example, the HUD may be configured to display a representation of a user's environment from the user's point of view. The HUD display may face the user within the user's field of vision. Such a helmet mounted system also reduces snag hazard and allows for integration with streamlined emergency personnel and critical worker procedures and workflows.

The visual communication and navigation system may comprise two or more modules to be coupled at different locations on a helmet, the two or more modules configured to minimize the added moment of inertia to reduce a user's perceived mass of the system. The two or more modules may be strategically placed to wrap around inner and outer surfaces of a helmet largely using available, unused space within and around a helmet. The two or more modules may be configured to implement a cognitive load reducing platform comprising a plurality of sensors, a compute subassembly (e.g., processor, memory) configured to execute a cognitive enhancement engine (e.g., software-based engine configured to process sensor data into enhanced characterization data configured to provide contextual and physiological visual, auditory, and/or haptic cues and information), and an output device (e.g., HUD, other visual display, headphones, earbuds, other auditory output devices, haptic device, and the like).

The two or more modules may include a vision module comprising a heads up display (HUD) combiner subassembly, one or more user control buttons, a laser, an indicator light, a camera and other sensors, and a cable connection interface, or a sub-combination thereof, as described in more detail herein. The two or more modules also may include a compute module comprising at an internal core subassembly including least some of the electronics for operation of the visual communication and navigation system (e.g., a circuit board assembly (e.g., CPU, other PCB or processing unit), memory, an antenna, and other computing components), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

In some examples, the visual communication and navigation system may include thermal protection features to protect electronic parts and systems, including heat resistant materials, insulation, heat reservoirs (e.g., heatsinks comprising phase change material to store heat dissipated from electronic parts and systems), heat spreaders, and the like.

Figure 1B:
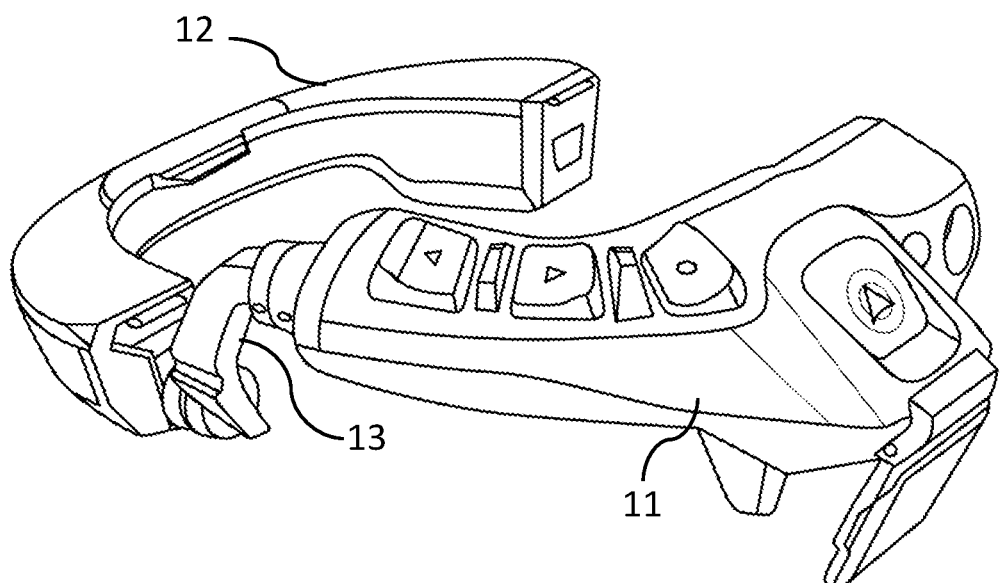

FIGS. 1A-1B are a side and a perspective view of an exemplary helmet with a balanced helmet mounted visual communication and navigation system, in accordance with one or more embodiments. A visual communication and navigation system 10 may be removably coupled (e.g., attached and detached using attachments 14-15) to helmet 16. Vision module 11 and compute module 12 are shown connected using cable 13 (e.g., comprising a system cable, a data cable, and/or other cables and wires). In some examples, vision module 11 attaches and detaches to vision module attachment 14 without tools, and compute module 12 similarly attaches and detaches to compute module attachment 15 without tools. Vision module attachment 14 and compute module attachment 15 may be more permanently coupled (e.g., adhesively bonded, mechanically attached) to helmet 16. In some examples, vision module attachment 14 may be coupled to a top surface of a front brim of helmet 16, as shown. In some examples, compute module attachment 15 may be coupled to a bottom surface of a back portion (e.g., brim) of helmet 16, as shown. Vision module 11 may include heads up display (HUD) combiner subassembly 17, which is shown in a partially open position wherein the display portion is flipped partially down (e.g., a position wherein the display is viewable by a user). As shown in FIG. 1B, a HUD may flip down into an open position to occupy a portion of a user's field of view. Said HUD may flip up into a closed position when not in use. In some examples, the HUD may be formed using materials able to withstand high heat, smoke-filled, and other extreme conditions. In some examples, the HUD may comprise a plurality of layers, including a world facing shell, a glass or plastic mirror or partial mirror, and a user facing shell, the world facing shell and user facing shell bonded, or otherwise secured, along their perimeter edge to create a sealed volume enclosing the mirror within. In some examples, the world facing shell and user facing shell may comprise a largely clear material configured to enable viewing of the glass display (e.g., a combiner glass configured to display a graphical user interface) and may be coated with hydrophilic material to minimize fogging and optical distortion from moisture (e.g., encourage water sheeting). In some examples, the world facing shell and user facing shell also may be treated with a coating, or may comprise a material, that is heat and/or debris resistant.

In some examples, vision module 11 may comprise a HUD combiner subassembly, one or more user control buttons, a laser, an indicator light, a camera and other sensors, and a cable connection interface, or a sub-combination thereof, as described in more detail herein. In some examples, compute module 12 may comprise an internal core subassembly including least some of the electronics for operation of the visual communication and navigation system (e.g., a circuit board assembly (e.g., CPU, other PCB or processing unit), memory, an antenna, and other computing components), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

Visual communication and navigation system 10 may comprise a thermal protection system including heat resistant materials, insulation, heat reservoirs (e.g., heat sinks comprising phase change material configured to store heat dissipated from electronic parts and systems), heat spreaders, as described herein.

Figure 2:
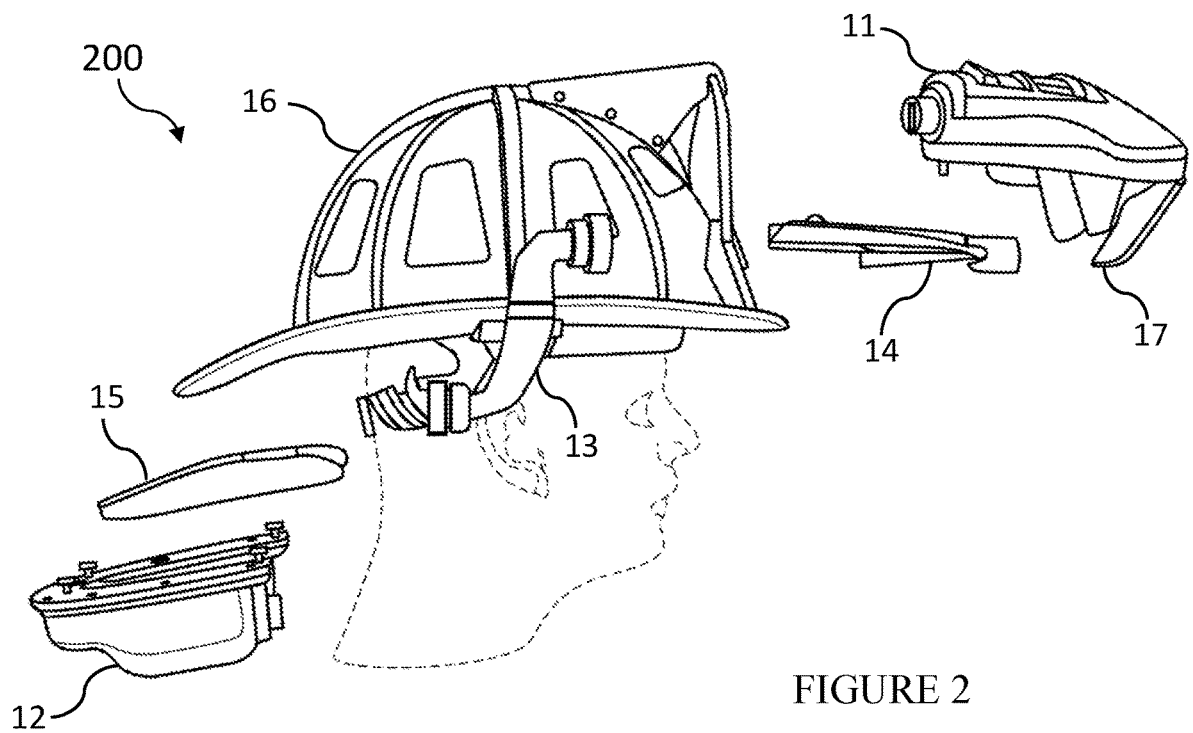
FIG. 2 is an exploded view of an exemplary helmet with a balanced helmet mounted visual communication and navigation system, in accordance with one or more embodiments.

FIG. 2 is an exploded view of an exemplary helmet with a balanced helmet mounted visual communication and navigation system, in accordance with one or more embodiments. All like-numbered elements in FIG. 2 are the same or similar to their corresponding elements in other figures. View 200 includes the same or similar vision module 11, compute module 12, cable 13, vision module attachment 14, compute module attachment 15, and helmet 16. In some examples, cable 13 may have one end removably coupled to vision module 11 and another end removably coupled to compute module 12. In some examples, cable 13 may comprise a housing, one or more electrical wires and/or light cables (e.g., coaxial, fiber optic, data, ethernet, twisted wire pairs, audio, HDMI, VGA, other video, and the like) housed (e.g., encased) within the housing, and two or more connector ends, each configured to physically, electrically, and communicatively connect to a module (e.g., vision module 11, compute module 12, and the like). In some examples, cable 13's housing may comprise heat resistant material. In some examples, cable 13's housing also may include insulation or other thermal protective features to protect electrical and/or light cables housed within from overheating. In other examples, cable 13's housing may be provided with a shape configured to approximately conform to a side contour of helmet 16 such that cable 13's housing does not jut out from helmet 16, thereby avoiding being a snag hazard (e.g., opportunity for snagging on other objects and surfaces with which the helmet, cable, and other parts of the helmet mounted visual communication and navigation system may contact). For example, as shown, said housing may be flatter left to right with a slight curve (e.g., a C-curve) so that one end connects with vision module 11 at least partly over the brim of helmet 16 and another end connects with compute module 12 at least partly under the brim of helmet 16. Also, as shown, said housing may be wider front to back to accommodate the volume of multiple cables and/or allow for cable angles due to tension or stiffness of materials. In some examples, said housing may have a slight double curve (e.g., an S-curve) in one dimension to reach corresponding connectors on two or more various modules. In other examples, cable 13's housing may comprise a flexible material able to take on any shape necessary to connect two or more modules and house any necessary electrical and light cables. In some examples, each end of cable 13 may comprise an interface for removably coupling to a corresponding connector on a module, mechanically (e.g., screwing or popping on and off) and electrically (e.g., male-female electrical, data, audio interfaces).

Figure 3:
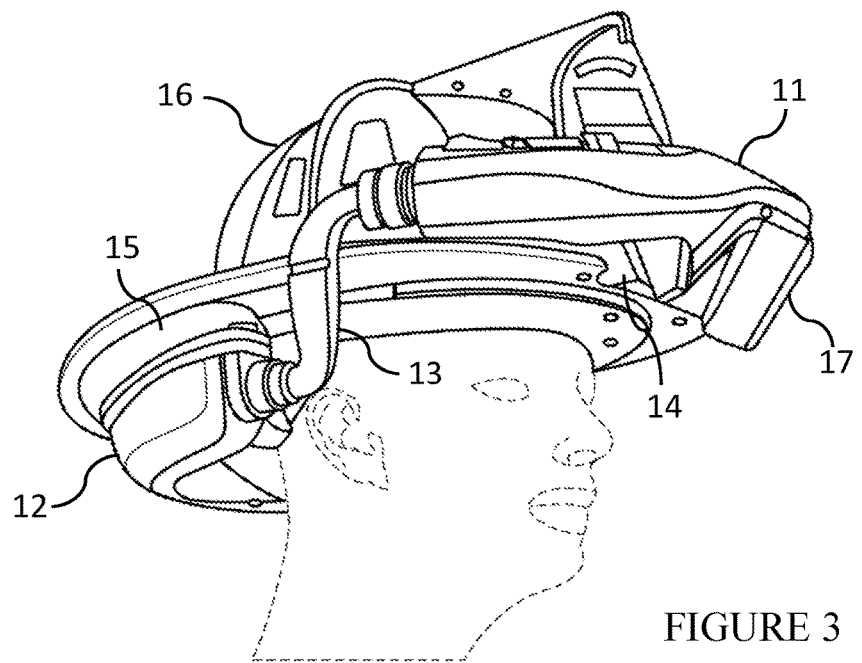
FIG. 3 is a perspective view of an exemplary helmet with a balanced helmet mounted visual communication and navigation system, in accordance with one or more embodiments.

FIG. 3 is a perspective view of an exemplary helmet with a balanced helmet mounted visual communication and navigation system, in accordance with one or more embodiments. All like-numbered elements in FIG. 3 are the same or similar to their corresponding elements in other figures.

Figure 4:
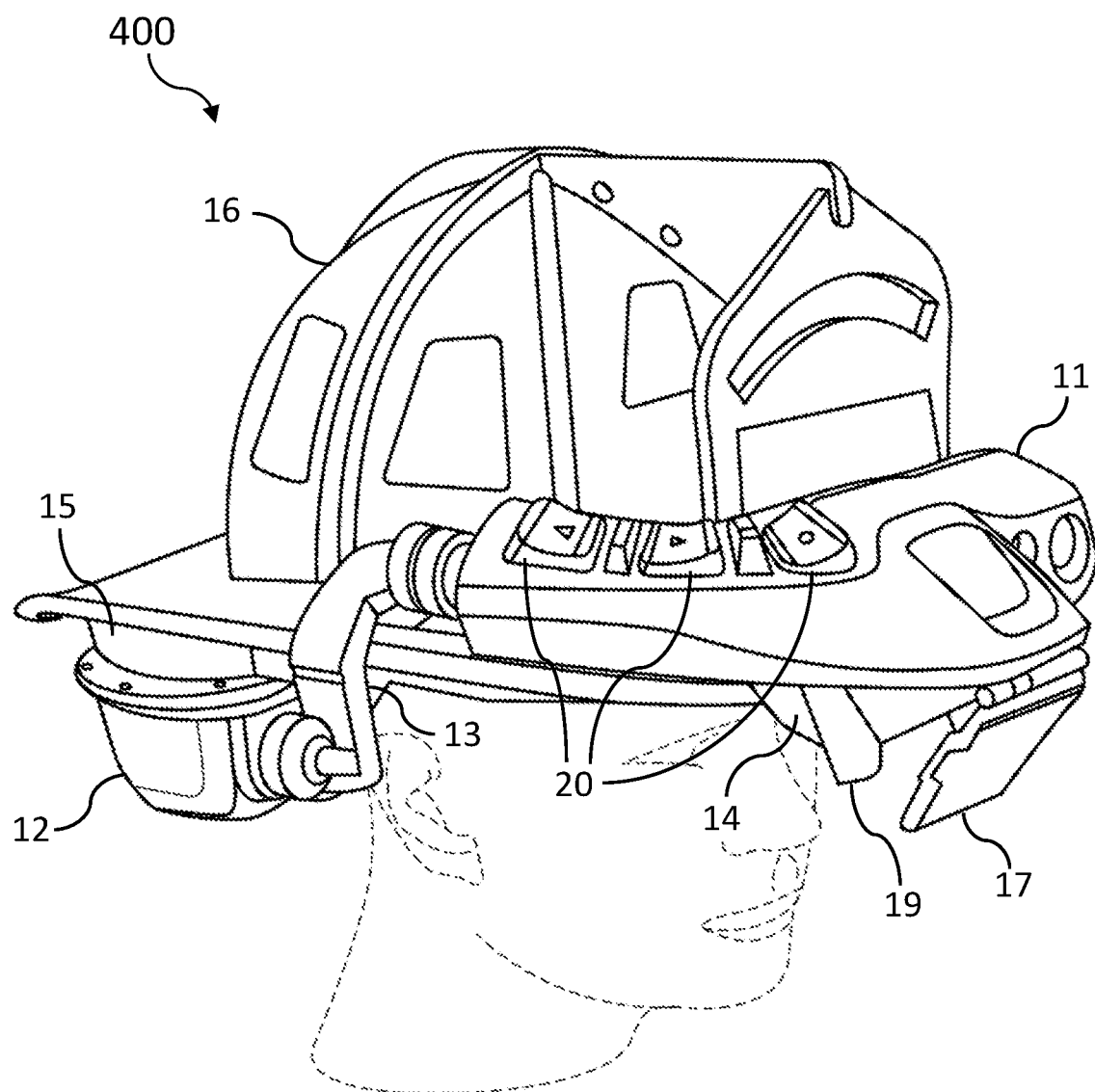
FIG. 4 is another perspective view of an exemplary helmet with a balanced helmet mounted visual communication and navigation system, in accordance with one or more embodiments.

FIG. 4 is another perspective view of an exemplary helmet with a balanced helmet mounted visual communication and navigation system, in accordance with one or more embodiments. All like-numbered elements in FIG. 4 are the same or similar to their corresponding elements in other figures. View 400 provides a top down perspective view that further shows an aperture 18, bumper(s) 19, and user control button(s) 20. In some examples, aperture 18 may be configured to provide an opening through which a thermal camera or other sensor may receive light and other sensory input. In some examples, aperture 18 may be covered with glass (e.g., germanium glass) or other material able to pass infrared light, for example, while providing an enclosure to maintain an ingress protected seal. In some examples, additional apertures may be provided on vision module 11 (e.g., for additional sensors, a laser, and the like).

In some examples, one or more bumper(s) 19 may be provided, for example, protruding down on either side of the HUD combiner subassembly 17 to protect the HUD combiner subassembly 17 from damage (e.g., from flying or falling debris, contact with obstacles, impact from normal wear and tear, and other impact from contact with surfaces and objects). In some examples, bumper(s) 19 may comprise elastomeric material.

In some examples, user control buttons 20 may control elements of a visual communications system, including one, or a combination, of a laser, lights (e.g., a rear communication (e.g., tail and/or brake) light facing backward on compute module 12, other lights on any module coupled to helmet 16 and/or coupled using cable 13), and any other visual communication unit or element on a helmet mounted visual communication and navigation system.

Figure 5:
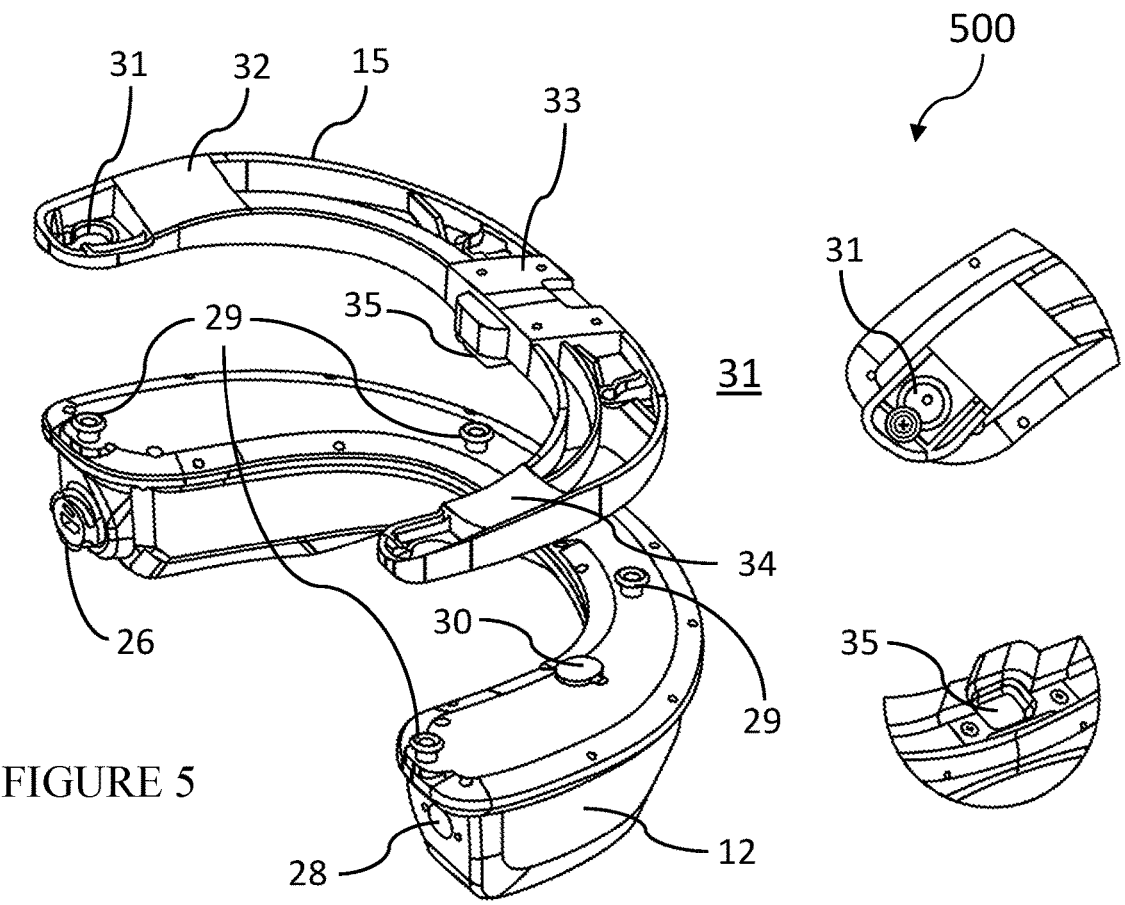
FIG. 5 is a perspective view of an exemplary compute module and its attachment element, in accordance with one or more embodiments.

FIG. 5 is a perspective view of an exemplary compute module and its attachment element, in accordance with one or more embodiments. Compute module 12 is shown including cable connection interface 26, power button 28, mounting studs (i.e., mounting spools, attachment studs, attachment spools) 29, charging and communications port 30. All like-numbered elements in FIG. 5 are the same or similar to their corresponding elements in other figures. In some examples, cable connection interface 26 may comprise an ingress protected locking electrical connector and may be configured to mate with a corresponding connection interface on an end of cable 13. Power button 28 may be configured to turn power on and off to some or all electrical components of compute module 12 and other modules in a helmet mounted navigation and communications system. Mounting studs 29 may be positioned on a top surface of compute module 12 and configured to engage with compute module attachment 15 on a helmet (e.g., helmet 16). In some examples, charging and communications port 30 may comprise one or more charging ports (e.g., USB-A, USB-B, USB-C, lightning, mini and micro versions thereof). In some examples, charging and communications port 30 may be covered with an elastomer environmental protection plug or cover (e.g., when not in use).

Compute module attachment 15 may include keyhole slots 31, adhesive mount pads 32-34, and release button 35. Keyhole slots 31 may be configured to receive, and engage with, mounting studs 29 to lock, or otherwise secure, compute module 12, in position onto compute module attachment 15, and thereby onto a helmet (e.g., helmet 16). In the example shown, there are 4 keyhole slots 31. In other examples, there may be more or fewer keyhole slots 31. Release button 35 may be provided to disengage compute module 12 from a latched position to compute module attachment 15 (e.g., release or push mounting studs 29 from keyhole slots 31).

Adhesive mount pads 32, 33, and 34 may be provided as or onto a surface of compute module attachment 15 to match a contour of a helmet to which compute module attachment 15 is being coupled. In some examples, adhesive mount pads 32, 33, and 34 may provide a surface area for adhesively bonding compute module attachment 15 to a helmet. Alternatively, other types of mount pads may be provided (e.g., in addition to or instead of adhesive mount pads 32-34) to attach compute module attachment 15 to a helmet. The shape, pattern, number of adhesive mount pads, and other configurations, on a helmet-facing portion of compute module attachment 15 may be varied to match different types of helmets (e.g., a top surface of compute module attachment 15 configured to match the underside contours of a brim of a given helmet 16), while keeping shape and coupling elements of a compute module-facing portion of compute module attachment 15 matching that of a given compute module 12. This modular design allows for a given compute module 12 to be removably coupled to different types of helmets.

Figure 6:
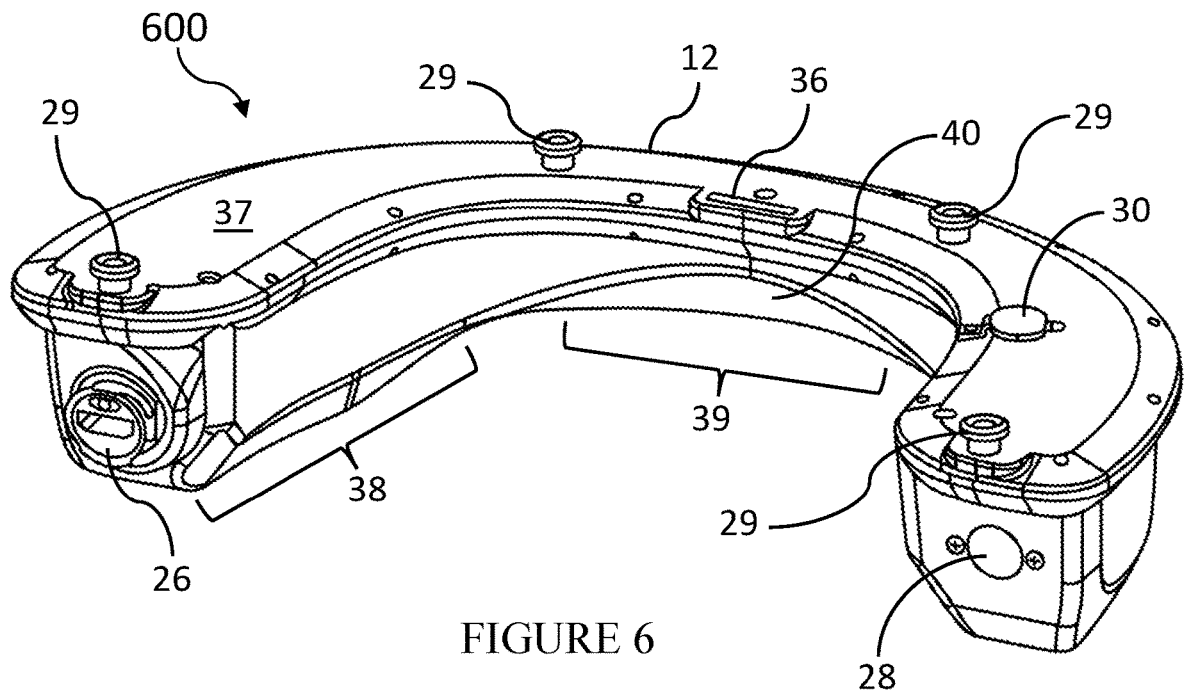
FIG. 6 is a perspective view of an exemplary compute module, in accordance with one or more embodiments.

FIG. 6 is a perspective view of an exemplary compute module, in accordance with one or more embodiments. View 600 shows compute module 12 in an assembled state, comprising cable connection interface 26, power button 28, mounting studs 29, charging and communications port 30, latching pocket 36, top surface 37, regions 38-39, and cutout feature 40. All like-numbered elements in FIG. 6 are the same or similar to their corresponding elements in other figures. Latching pocket 36 may be configured to engage with a corresponding locking mechanism on compute module attachment 15 to lock compute module 12 in place until release button 35 is depressed. Compute module 12 may have an overall shape defined by lower region 38, a larger (e.g., thicker) region provided symmetrically on two (e.g., balanced left and right) portions of compute module 12. Region 38 may be sized to accommodate more or larger internal electrical components of compute module 12. Two lower regions 38 may be separated by a smaller (e.g., thinner) middle region 39, which allows a space underneath for access to elements underneath and within a helmet (e.g., helmet 16), such as an adjustment knob for tightening or loosening a strap or other part in the helmet. In some examples, middle region 39 may include a chambered cut out surface feature 40 for even greater access to (e.g., more room to maneuver) a helmet adjustment element. For example, firefighting and other safety helmets often have a ratcheting knob in their rear internal portion for adjusting a retention strap—middle region 39 and surface feature 40 would allow greater access to said ratcheting knob.

Figure 7:
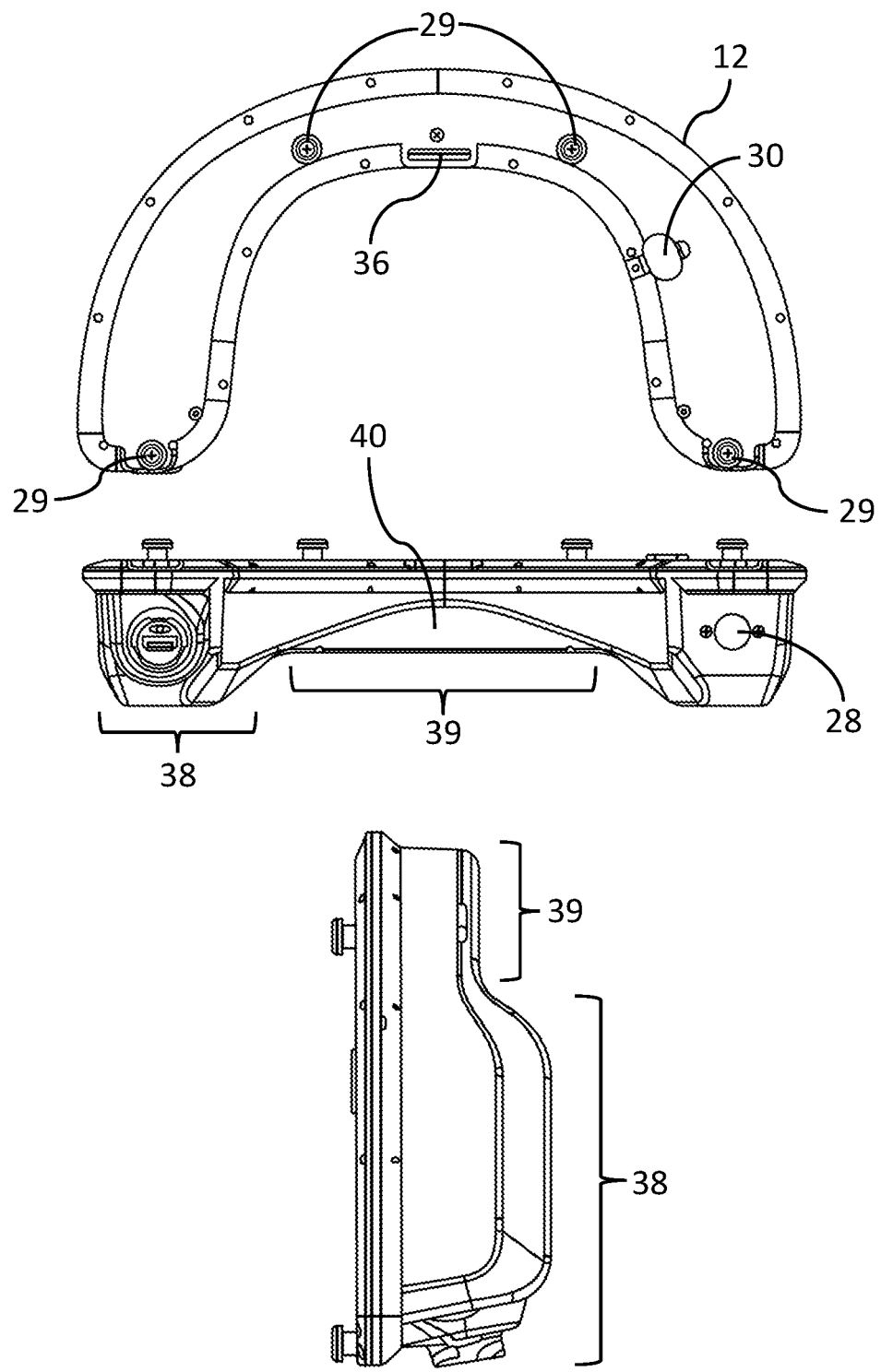
FIG. 7 is a front, top, and side view of an exemplary compute module, in accordance with one or more embodiments.

FIG. 7 is a front, top, and side view of an exemplary compute module, in accordance with one or more embodiments. These views provide different views of elements of compute module 12 described herein. All like-numbered elements in FIG. 7 are the same or similar to their corresponding elements in other figures.

Figure 8:
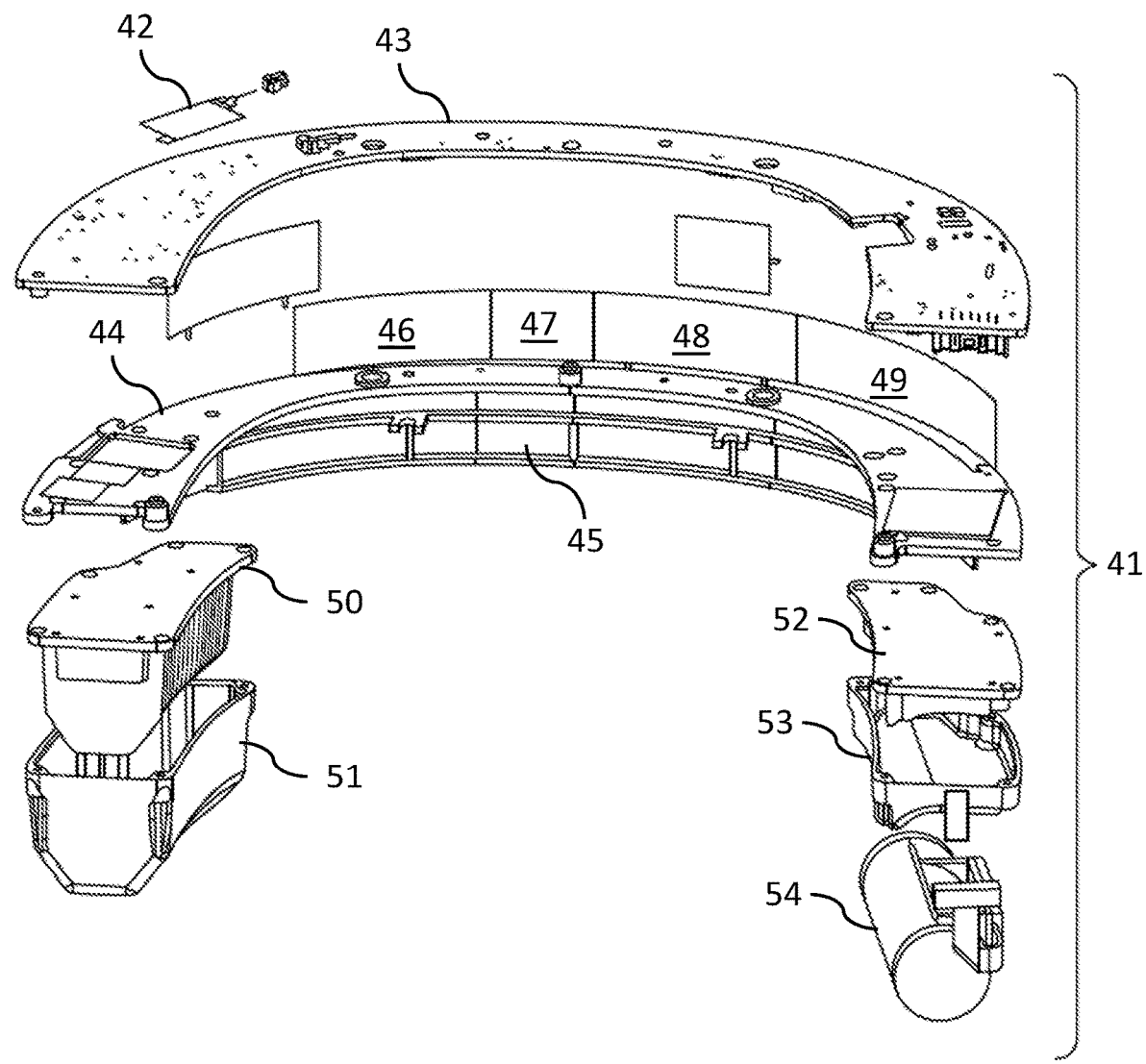
FIG. 8 is an exploded view of an internal core subassembly in an exemplary compute module, in accordance with one or more embodiments.

FIG. 8 is an exploded view of an internal core subassembly in an exemplary compute module, in accordance with one or more embodiments. Internal compute subassembly 41 may include many or all of the active electronic components of compute module 12, including antennas 42 and 46-49, main printed circuit board assembly (PCBA) 43, heat spreader and stiffener 44, antenna support 45, heat sink cores 50 and 52, heat sink shells 51 and 53, and battery module 54. All like-numbered elements in FIG. 8 are the same or similar to their corresponding elements in other figures. The internal core subassembly 41 may be built and tested during production prior to assembling into a compute module exterior housing (e.g., compute module exterior housing 56 in FIGS. 9 and 12). In some examples, compute module 12 may include a sensor unit for reading an identification (ID) tag (e.g., RFID tag, NFC tag, QR code, and other unique tags) provided on a compute module attachment 15. For example, antenna 42 may comprise an RFID antenna, as shown relative to main PCBA 43. In other examples, a camera or other type of reader may be provided instead of, or in addition to, antenna 42. In some examples, the ID tag may enable configuration and/or customization of a helmet mounted navigation and communications system to a given helmet or a user (e.g., to a user's assigned helmet). In other examples, the ID tag may enable collection of data associated with a given helmet or a user of the given helmet.

Main PCBA 43 may be shaped to wrap around a back portion of a user's head and under a brim of a helmet (e.g., helmet 16). Heat spreader and stiffener 44 may be configured to provide stiffness and support to compute module internal core assembly 41 generally, and to main PCBA 43 in particular, for example, to prevent flexing main PCBA 43 during manufacturing handling or use. As shown, main PCBA 43 may be shaped to have a thin width in the middle to correspond to the shape of other portions of compute module 12 (e.g., compute module exterior housing 56 in FIGS. 9 and 12). Heat spreader and stiffener 44 also may be configured to allow electronic elements on either end of main PCBA 43 to share heat, and thereby not overheat. Heat spreader and stiffener 44 also may provide a bridge between heat from main PCBA 43 and heat sinks below (e.g., a right heat sink comprising heat sink core 50 and heat sink shell 51 and a left heat sink comprising heat sink core 52 and heat sink shell 53). Heat sink cores 50 and 52, and heat sink shells 51 and 53, may be filled with phase change material (e.g., parrafin wax, other hydrocarbons, salt hydrate solutions, and the like) to provide thermal energy storage. For example, phase change material contained in the left and right heat sinks may be configured to phase change from a solid to a liquid, thereby storing heat dissipated from electronic components of compute module 12. High heat generating electronic components on main PCBA 43 may be placed on the wider ends of main PCBA 43 that correspond to the areas above the right and left heat sinks, thereby allowing heat dissipated from said electronic components to be conducted into the left and right heat sinks. Such placement increases compute module 12's ability to conduct heat from the electronics to the left and right heatsinks while minimizing and balancing the mass of compute module 12. For example, two or more heat sinks (e.g., left and right) may be distributed between the two larger regions of the housing in a manner that balances an overall mass of the compute module and reduces the moment of inertia. This enables compute module 12 to operate in extreme environments where it is unable to transfer heat to ambient surrounding air.

Battery (i.e., power) module 54 is an internal subassembly that may include a battery protection circuit PCBA, a battery cell, and a connector. In some examples, battery module 54 may not be serviceable. A battery module connector may connect to main PCBA 43. Antenna support 45 may be made of a plastic material and coupled to heat spreader and stiffener 44 (e.g., by screws). In some examples, antennas 46, 47, 48, and 49 may be attached to antenna support 45 with pressure sensitive adhesive. One or more of antennas 46-49 may be radio frequency antennas. Antennas 46-49 may be positioned on antenna support 45 along a back rear area of compute module 12 to provide antennas 46-49 with wide fields of view (e.g., pointing out and away from a back and/or side portion of a helmet and a user's head). As described herein internal core assembly 41 allows for a majority of electronic components, radio frequency and other antennas, heat sinks, and a battery module to be handled as a unit during production, assembly, and testing.

Figure 9:
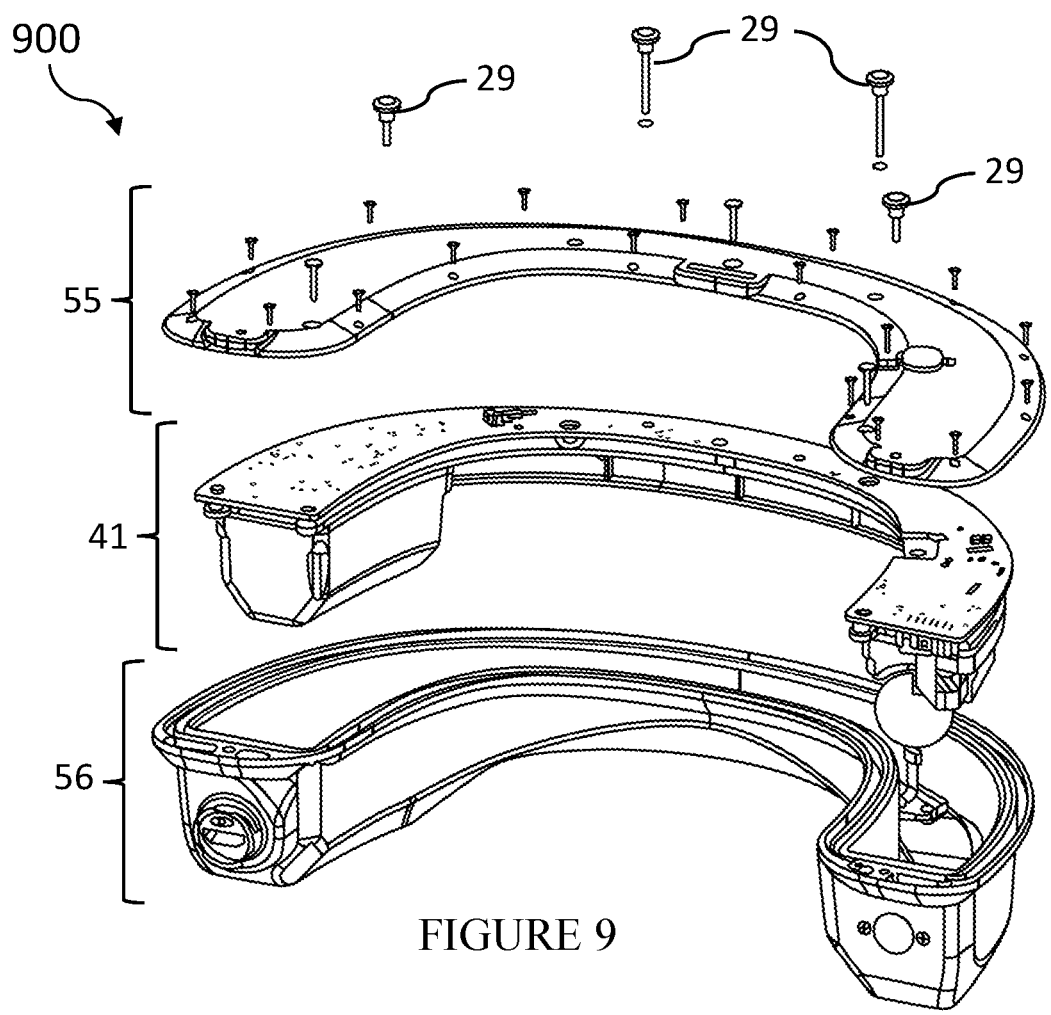
FIG. 9 is an exploded view of an exemplary compute module with top and bottom enclosers, in accordance with one or more embodiments.

FIG. 9 is an exploded view of an exemplary compute module with top and bottom enclosers, in accordance with one or more embodiments. View 900 shows the three main subassemblies of compute module 12, including compute module internal core subassembly 41, compute module bottom enclosure subassembly 56, and compute module top enclosure subassembly 55, in an exploded manner indicating how they may line up. All like-numbered elements in FIG. 9 are the same or similar to their corresponding elements in other figures. The compute module bottom enclosure subassembly 56 and compute module top enclosure subassembly 55 are shown and described in more detail in the following figures. Mounting studs 29 are also shown.

Figure 10:
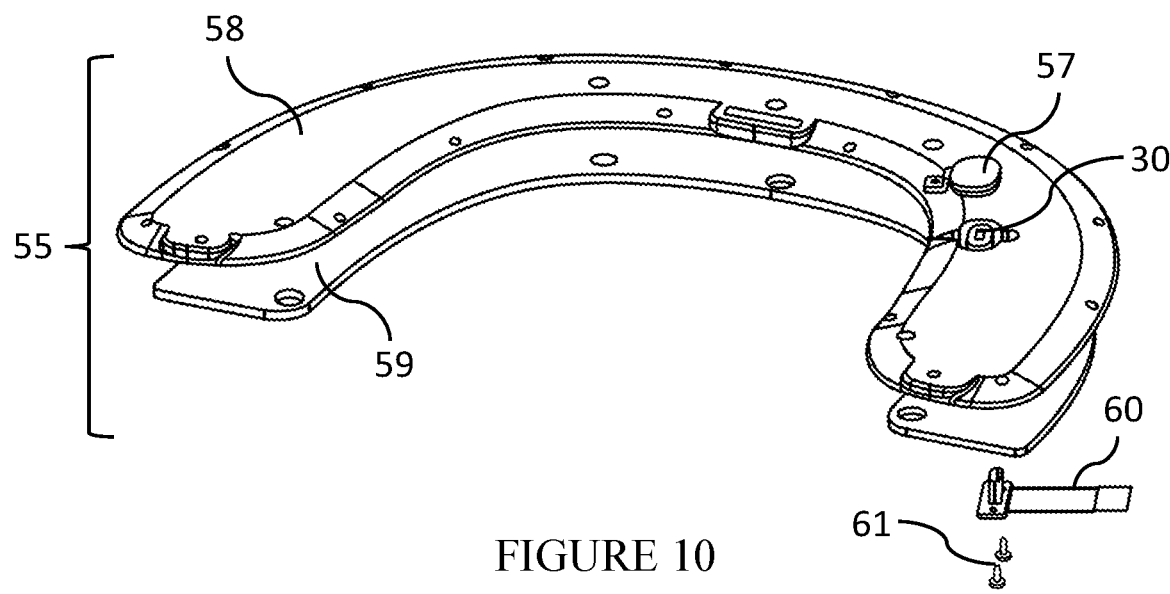
FIG. 10 is a perspective view of a top enclosure subassembly of an exemplary compute module, in accordance with one or more embodiments.

FIG. 10 is a perspective view of a top enclosure subassembly of an exemplary compute module, in accordance with one or more embodiments. Compute module top subassembly 55 comprises cover 57, top enclosure part 58, top insulation part 59, flex circuit 60, and screws 61. All like-numbered elements in FIG. 10 are the same or similar to their corresponding elements in other figures. Cover 57 may comprise a protective elastomer plug or cover (e.g., to protect a charging and communications port, such as USB-A, USB-B, USB-C, lightning, and mini and micro versions thereof). In some examples, top enclosure part 58 and top insulation part 59 may be plastic injection molded or otherwise formed of plastic material. Compute module top insulation part 59 may form a top portion of a protective envelope of semi-rigid, very low thermal conductivity foam to prevent external heat from entering compute module 12. In an example, top insulation part 59 may correspond to a top inner surface of top enclosure part 58, which together with bottom enclosure housing 62 form a housing for compute module 12. Top enclosure subassembly 55 may include flex circuit 60 for connecting a charging and communications port (e.g., charging and communications port 30). Flex circuit 60 may be fastened to top enclosure part 58 and/or top insulation part 59 using screws 61.

Figure 11:
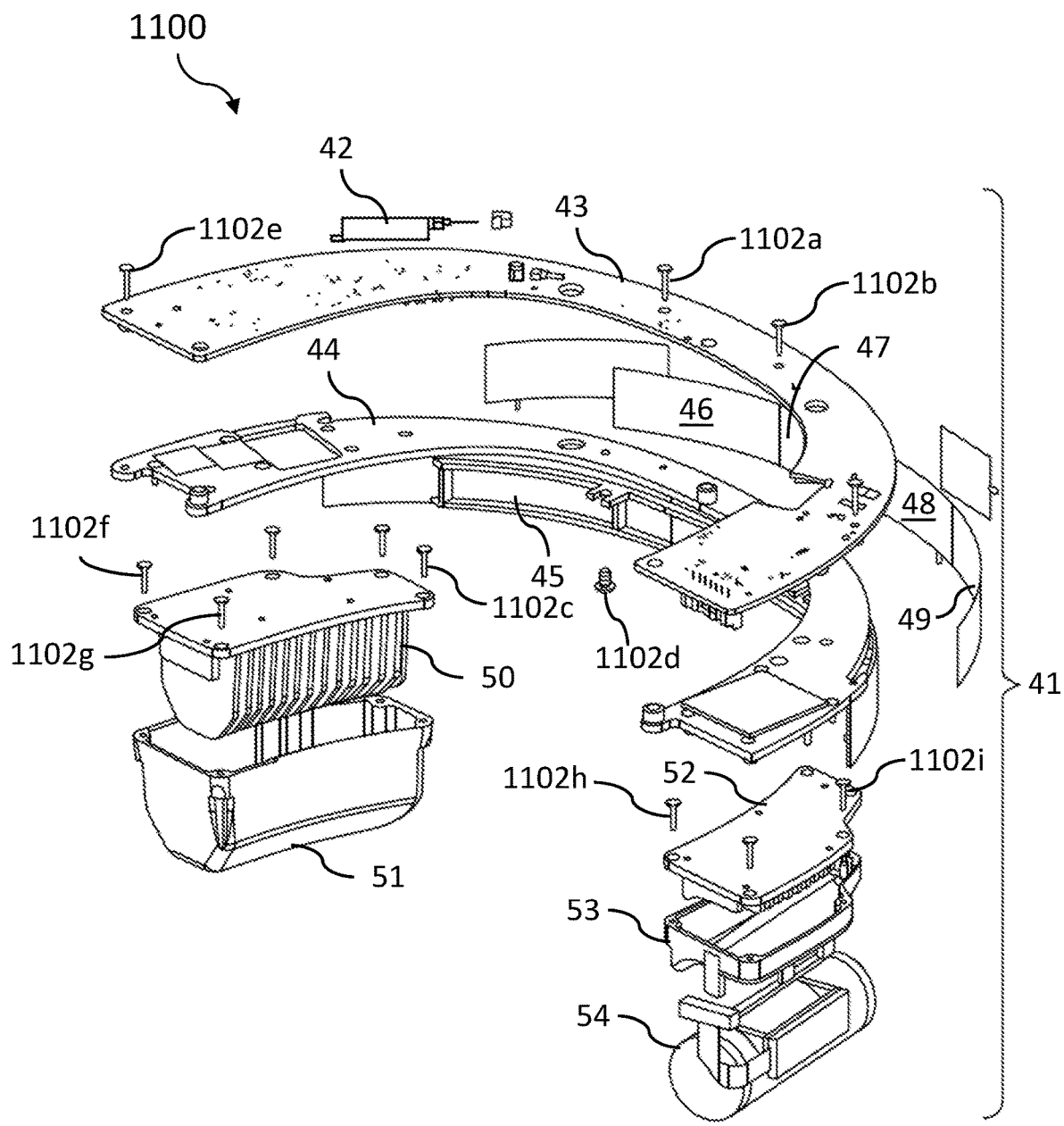
FIG. 11 is an exploded view of another internal core subassembly in an exemplary compute module, in accordance with one or more embodiments.

FIG. 11 is an exploded view of another internal core subassembly in an exemplary compute module, in accordance with one or more embodiments. All like-numbered elements in FIG. 11 are the same or similar to their corresponding elements in other figures. In addition to components described above, view 1100 further shows various fasteners (e.g., fasteners 1102a-1102i) that may be used to attach heat sink cores 50 and 52 and heat sink shells 51 and 53 to each other, as well as to PCBA 43 and heat spreader and stiffener 44. In other examples, more or fewer fasteners may be used to attach components of the internal core subassembly. Other types of fasteners and means of coupling electronic, housing, and thermal protection components also may be used.

Figure 12:
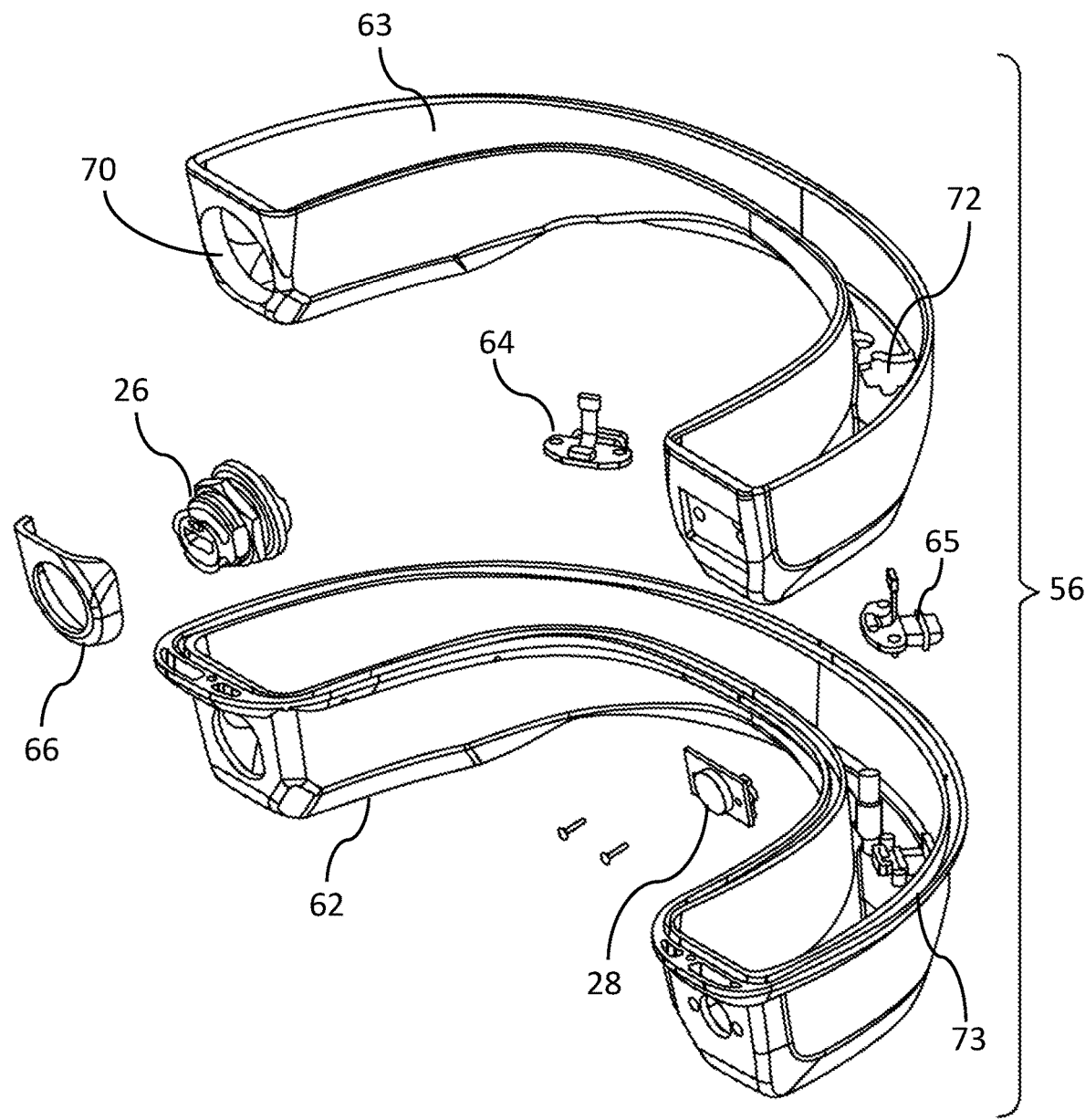
FIG. 12 is an exploded view of a bottom enclosure subassembly of an exemplary compute module, in accordance with one or more embodiments.

FIG. 12 is an exploded view of a bottom enclosure subassembly of an exemplary compute module, in accordance with one or more embodiments. All like-numbered elements in FIG. 12 are the same or similar to their corresponding elements in other figures. Compute module bottom enclosure subassembly 56 may include bottom enclosure housing 62, bottom insulation 63, rear light sub-assembly 64-65, cable connection interface cover 66, cable connection interface opening 70, power button opening 71, light PCBA cutout 72, and seal groove 73. All like-numbered elements in FIG. 12 are the same or similar to their corresponding elements in other figures. Bottom enclosure housing 62 may be injection molded from a resin with a high impact strength and high heat deflection temperature. Bottom insulation 63 may be placed inside bottom enclosure housing 62 to form two or more layers of an insulating system configured to protect and insulate internal components of compute module 12. For example, bottom insulation 63 may correspond to a bottom inner surface of bottom enclosure housing 62. Light subassemblies 64-65 may comprise PCBs with LEDs configure to project light through clear light pipes and out of openings in bottom enclosure housing 62. Such LED lights may be used as rear communication (e.g., "brake") lights. Cable connection interface cover 66 may comprise a hard plastic or elastomer part used to minimize snag hazards, provide thermal protection, and protect the ingress protected cable connection interface 26 from impact. Cable connection interface opening 70 provides an opening in bottom insulation 63 to allow a connector (e.g., an electrical connector) to pass through the insulation. Power button opening 71 provides an opening in bottom insulation 63 for a power button PCB to be coupled to an enclosure wall and a power button (e.g., power button 28) to be user accessible. Light PCBA cutout 72 comprises one of two symmetrically placed cutouts in bottom insulation 63 to allow light subassemblies 64-65 to pass through the insulation and a wall of bottom enclosure housing 62. Bottom enclosure housing 62 includes an ingress protection seal groove 73 for placement of a form-in-place gasket, bonded-in-place gasket, or other separate elastomeric seal to prevent ingress of water and other undesirable elements.

Figure 13:
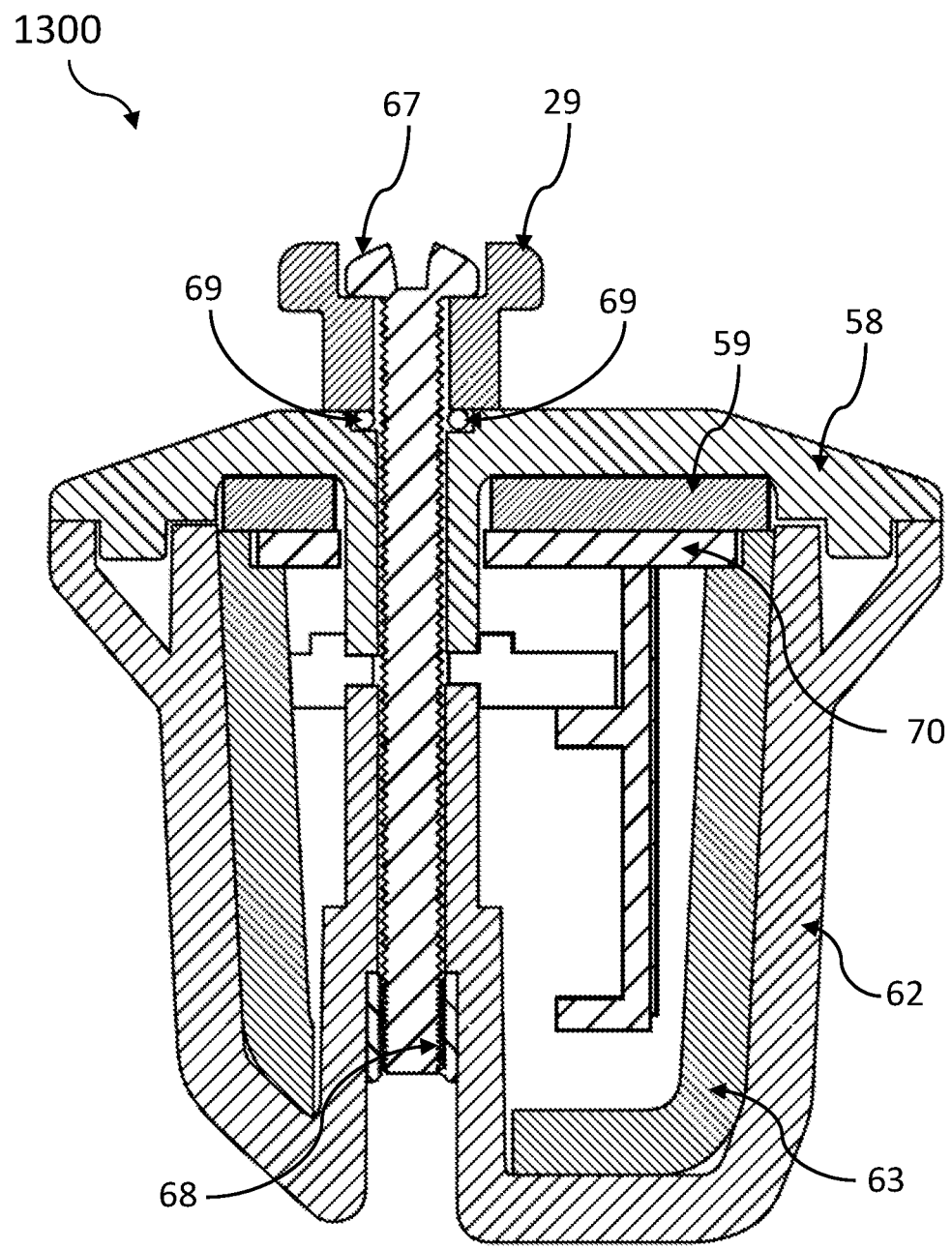
FIG. 13 is a cross-section view of an exemplary compute module, in accordance with one or more embodiments.

FIG. 13 is a cross-section view of an exemplary compute module, in accordance with one or more embodiments. All like-numbered elements in FIG. 13 are the same or similar to their corresponding elements in other figures. View 1300 shows mounting stud 29 with mounting screw 67, which may be thread into an ultrasonically welded or heat staked metal threaded insert 68. Sealing o-ring 69 is positioned below mounting stud 29 to keep water out of compute module 12. Compute module top insulation part 59 and bottom insulation 63 creates a perimeter of insulation around internal components of compute module 12 (e.g., along an internal surface of compute module 12). All like-numbered elements in FIG. 12 are the same or similar to their corresponding elements in other figures.

In some examples, the navigation and communications system may include thermal protection features to protect electronic parts and systems, including heat resistant materials, insulation, heat reservoirs (e.g., heatsinks comprising phase change material to store heat dissipated from electronic parts and systems), heat spreaders, and the like.

Figure 14A:
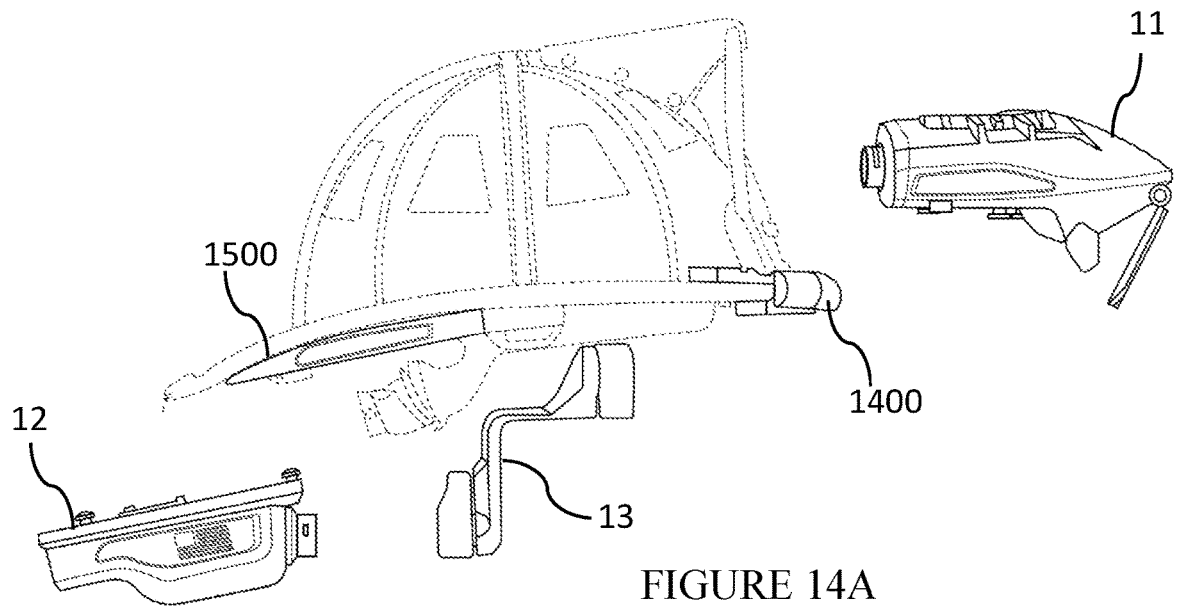
FIGS. 14A-14B are exploded views of an alternative balanced helmet mounted visual communication and navigation system, in accordance with one or more embodiments.
Figure 14B:
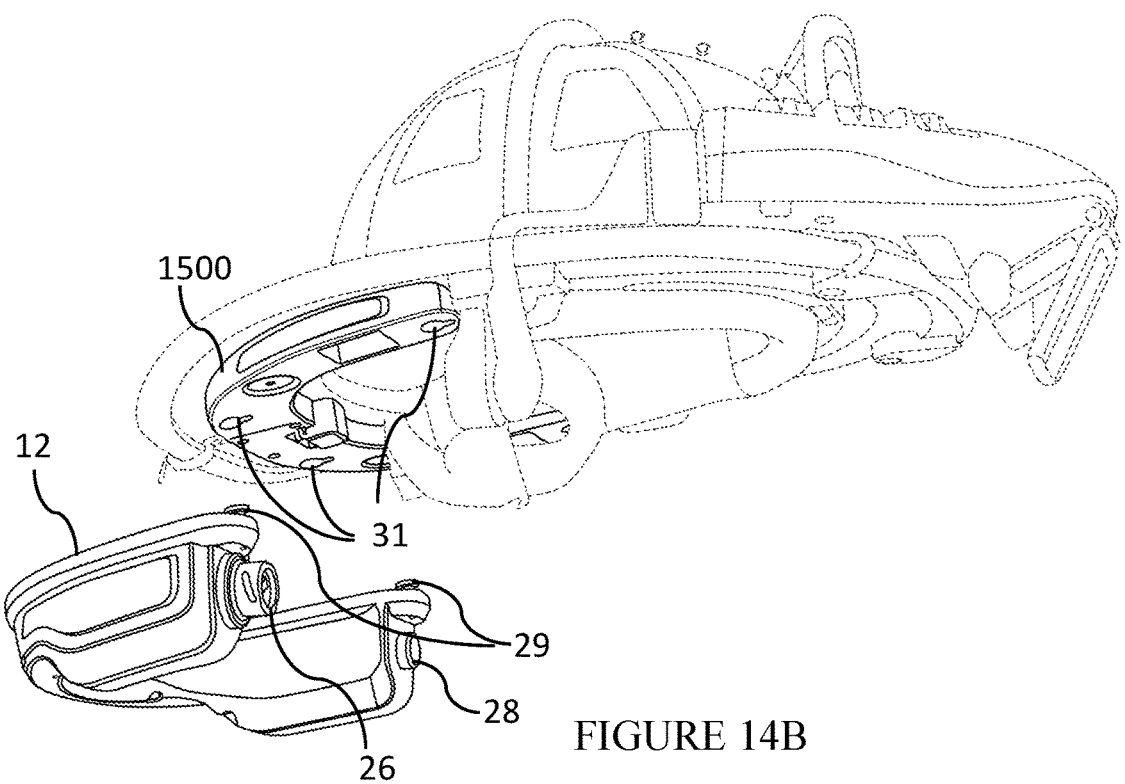

FIGS. 14A-14B are exploded views of an alternative balanced helmet mounted visual communication and navigation system, in accordance with one or more embodiments. All like-numbered elements in FIGS. 14A-14B are the same or similar to their corresponding elements in other figures. FIG. 14A illustrates alternative vision module attachment 1400 for removably coupling vision module 11 to a helmet, and alternative compute module attachment 1500 for removably coupling compute module 12 to a helmet. FIG. 14B illustrates additional details for the alternative compute module attachment 1500. Similar to other compute module attachments described herein, attachment 1500 also may comprise keyhole slots 31 configured to receive mounting studs (i.e., mounting spools, attachment studs, attachment spools) 29 for securely coupling compute module 12 to alternative compute module attachment 1500.

Figure 15A:
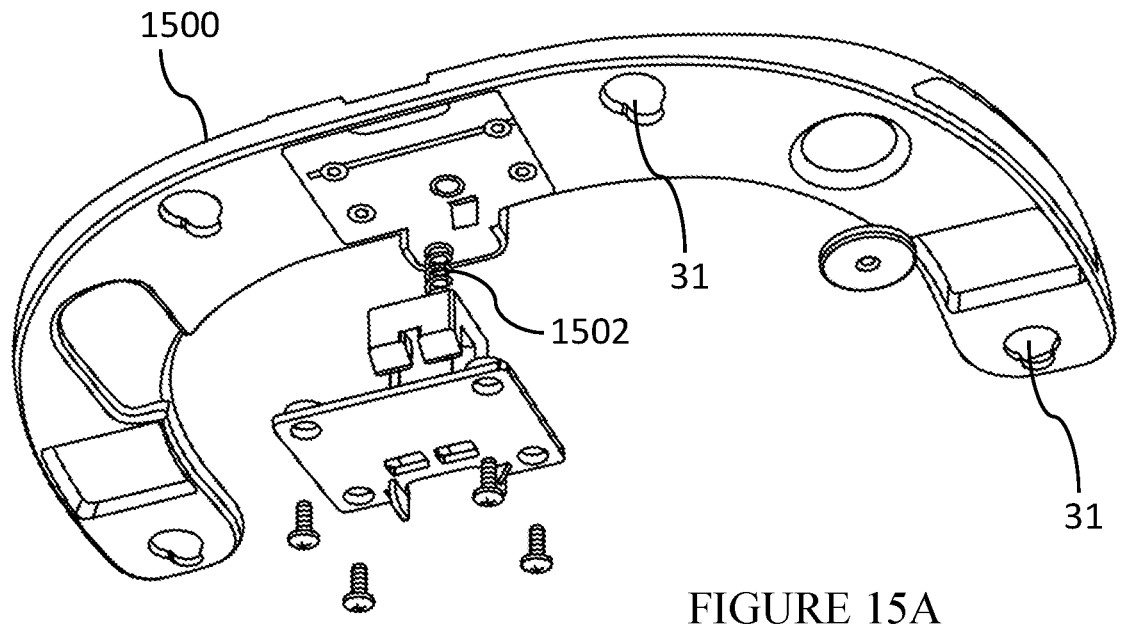
FIGS. 15A-15B are exploded views of an alternative compute module attachment, in accordance with one or more embodiments.
Figure 15B:
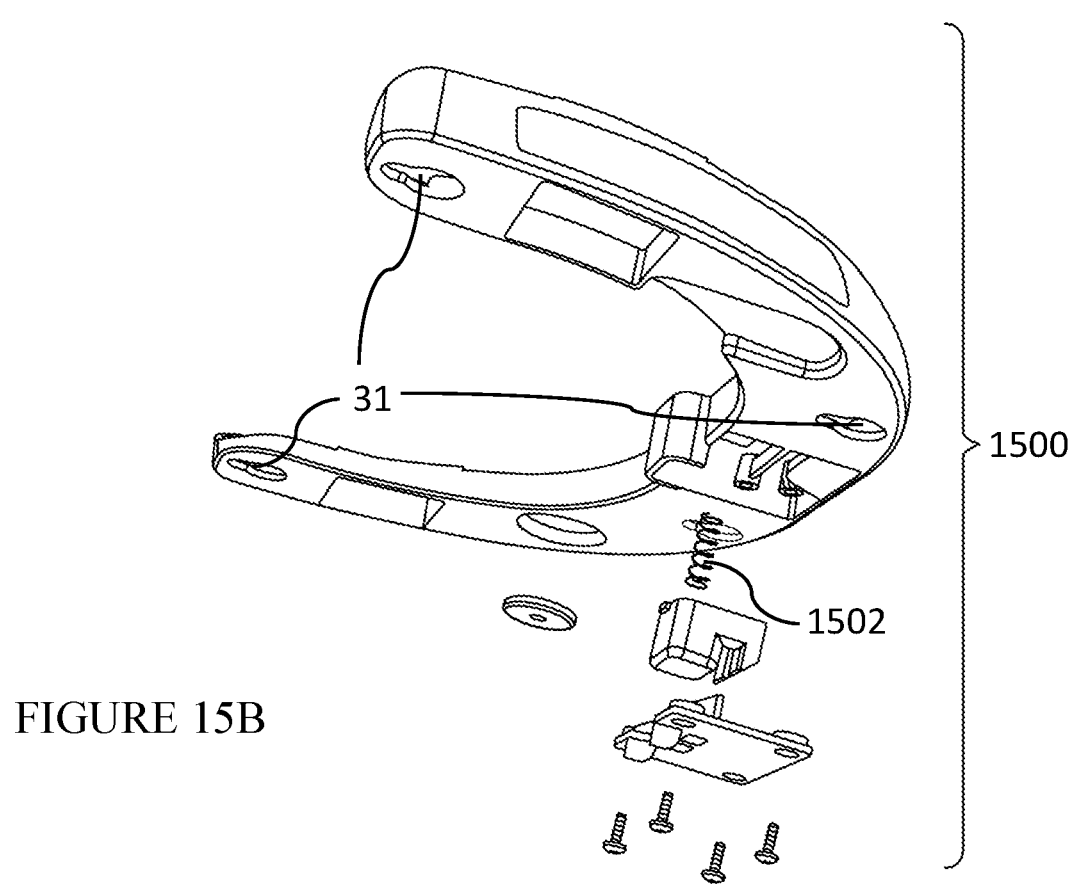

FIGS. 15A-15B are exploded views of an alternative compute module attachment, in accordance with one or more embodiments. All like-numbered elements in FIGS. 15A-15B are the same or similar to their corresponding elements in other figures. Compute module attachment further may comprise spring 1502 to aid in the release of a removably coupled compute module (e.g., using release button 35, as described herein).

A person of ordinary skill in the art will recognize that the systems described herein may be implemented on various types of protective headgear used by emergency response personnel and critical workers for any type of emergency response, military, law enforcement, public safety, and other similar efforts and missions.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A compute module for a helmet mounted visual communication and navigation system, comprising:
    a housing having two larger regions provided symmetrically and a smaller region provided between the two larger regions;
    an internal compute subassembly including a printed circuit board assembly (PCBA) having two wider portions corresponding to the two larger regions of the housing and a narrower portion corresponding to the smaller region of the housing;
    two or more heat sinks configured to store heat dissipated from electronic components of the internal compute subassembly;
    a cable connection interface; and
    a power button,
    wherein the internal compute subassembly comprises a bottom subassembly, including one, or a combination, of a bottom enclosure housing, a bottom insulation, a rear light sub-assembly, a cable connection interface cover, a cable connection interface opening, a power button opening, and a light PCBA cutout, and
    wherein the bottom enclosure housing comprises an injection molded material characterized by a high impact strength and high heat deflection temperature.

2. The compute module of claim 1, wherein the cable connection interface comprises an ingress protected locking electrical connector configured to mate with a corresponding connection interface on a cable.

3. The compute module of claim 1, further comprising a mounting stud on a top surface of the compute module, the mounting stud configured to couple to a compute module attachment, the compute module attachment configured to removably couple the compute module to a helmet.

4. The compute module of claim 1, further comprising:
    a latching pocket configured to engage with a locking mechanism on a compute module attachment; and
    a button configured to release the latching pocket from the locking mechanism.

5. The compute module of claim 1, wherein the housing and the PCBA each comprise a portion shaped to fit around a back portion of a user's head.

6. The compute module of claim 1, wherein the two or more heat sinks are distributed between the two larger regions of the housing in a manner that balances an overall mass of the compute module.

7. The compute module of claim 1, wherein each of the two or more heat sinks comprises a heat sink core and a heat sink shell.

8. The compute module of claim 1, wherein the two wider portions of the PCBA comprise more heat-producing electronics and are adjacent to the two or more heat sinks.

9. The compute module of claim 1, wherein the internal compute subassembly further comprises a heat spreader.

10. The compute module of claim 9, wherein the head spreader is configured to provide a stiffening support for the internal compute subassembly.

11. The compute module of claim 9, wherein the heat spreader comprises an antenna support configured to couple an antenna to the internal compute subassembly.

12. The compute module of claim 11, wherein the antenna support is configured to position one or more antennas along a rear area of the compute module such that the one or more antennas have a wide field of view.

13. The compute module of claim 1, wherein the compute module further comprises a sensor configured to receive and transmit data related to a user.

14. The compute module of claim 13, wherein the sensor comprises one, or a combination, of an NFC antenna, an RFID antenna, a camera, and a scanner.

15. The compute module of claim 1, wherein the internal compute subassembly comprises a top subassembly, including a cover, a top enclosure part, a top insulation, and a flex circuit.

16. The compute module of claim 15, wherein the cover comprises an elastomer material configured to protect a charging and communications port.

17. The compute module of claim 16, wherein the flex circuit is configured to connect to the charging and communications port.

18. The compute module of claim 1, wherein the rear light sub-assembly comprises a PCB with LED configured to project light through a clear light pipe and out of an opening in the bottom enclosure housing.

19. The compute module of claim 1, wherein the cable connection interface opening provides a passage for an electrical connector to pass through a layer of insulation.

20. The compute module of claim 1, wherein the light PCBA cutout comprises two symmetrically placed cutouts to allow the real light sub-assembly to pass through one or both of an insulation and a surface of the housing.

21. The compute module of claim 1, further comprising an insulation, wherein the insulation comprises a top insulation portion corresponding to a top inner surface of the housing and a bottom insulation portion corresponding to a bottom inner surface of the housing.

\* \* \* \* \*